United States Patent [19]

Block

[11] 4,244,835

[45] Jan. 13, 1981

[54] METHOD OF DISPERSING ALPHA ALUMINA MONOHYDRATE

[75] Inventor: Jacob Block, Rockville, Md.

[73] Assignee: W. R. Grace & Co., New York, N.Y.

[21] Appl. No.: 969,547

[22] Filed: Dec. 14, 1978

[51] Int. Cl.$^3$ .............................................. B01J 13/00
[52] U.S. Cl. ............................ 252/313 R; 106/308 B; 252/314; 252/363.5
[58] Field of Search .................... 252/313 R, 363.5; 106/308 B

[56] References Cited

U.S. PATENT DOCUMENTS

| | | | |
|---|---|---|---|
| 2,590,833 | 4/1952 | Bechtold et al. | 252/313 R |
| 3,357,791 | 12/1967 | Napier | 423/630 |
| 3,408,160 | 10/1968 | Schmidt et al. | 252/363.5 X |
| 3,509,066 | 4/1970 | Jacobs et al. | 252/313 R |
| 3,919,403 | 11/1975 | Pullen et al. | 423/628 |

OTHER PUBLICATIONS

Physical and Chemical Aspects of Absorbants and Catalysts, edited by B. G. Linsen, (1970), pp. 188–190.

*Primary Examiner*—Richard D. Lovering
*Attorney, Agent, or Firm*—Howard J. Troffkin; William W. McDowell, Jr.

[57] ABSTRACT

A method of forming an aqueous dispersion of alpha alumina monohydrate by subjecting a mixture of water and alpha alumina monohydrate to high shear rates. The process is further enhanced by having the mixture contain a small amount of a base selected from a water soluble alkali metal hydroxide, carbonate or oxide. The invention is also directed to a water dispersable alpha alumina monohydrate composition comprising solid particulate alpha alumina monohydrate having from 1 to 5% by weight of an alkali metal oxide, hydroxide or carbonate or ammonium hydroxide substantially uniformly mixed therewith.

10 Claims, No Drawings

METHOD OF DISPERSING ALPHA ALUMINA MONOHYDRATE

BACKGROUND OF THE INVENTION

This invention relates to a new and improved method for producing aqueous dispersions of alpha alumina monohydrate and to compositions suitable for forming said dispersions. More specifically, the subject invention comprises a method of readily producing an aqueous dispersion of alpha alumina monohydrate by forming a mixture of alpha alumina monohydrate and water, and subjecting the mixture to high shear rates. The subject invention further comprises forming a composition of alpha alumina monohydrate and an alkali metal oxide, hydroxide or carbonate, forming an aqueous mixture of said composition and subjecting the aqueous mixture to high shear rates for a period of time to form a uniform dispersion.

The ability to homogeneously disperse alpha alumina monohydrate in water is a highly desired object. Aqueous dispersions of alpha alumina monohydrate are required in the formation of extrudates, catalytic monolith surface coatings and aqueous pseudoplastic compositions.

Much effort has been devoted to the development of methods of preparing aqueous dispersions of alpha alumina monohydrate. Conventional manners of producing such dispersions require the utilization of acidic agents. For example, U.S. Pat. No. 3,408,160 to Schmidt et al teaches that one can form alumina slurries by the addition of an acid. Similarly, U.S. Pat. No. 3,357,791 to Napier discloses a method for producing a colloidal dispersion of a monohydrate of aluminum by the addition of about 2.8 weight percent hydrochloric acid based on the alumina monohydrate present. These methods of forming aqueous dispersions are not suitable for certain purposes, such as in the formation of catalytic material due to the required inclusion of a contaminating agent. In other instances the previously known methods are undesirable due to the corrosive nature of the resultant acidic media. Furthermore, the dispersions formed with the aid of an acidic agent do not exhibit the degree of pseudoplasticity required for many applications.

SUMMARY OF THE INVENTION

The subject invention is directed to a method of preparing an aqueous dispersion of alpha alumina monohydrate by forming a mixture of water and particulate alpha alumina monohydrate and subjecting the mixture to high shear rates. The process is unexpectedly further enhanced by the inclusion into the mixture of a small quantity of a water soluble base. The present invention is further directed to the formation of a substantially uniform mixture of a water soluble base and particulate alpha alumina monohydrate as well as the utilization of this mixture to form an aqueous dispersion exhibiting pseudoplastic properties.

DETAILED DESCRIPTION OF THE INVENTION

The aqueous dispersion of alpha alumina monohydrate prepared in accordance with the method of the present invention are useful for numerous applications such as wall coatings, anti-static materials, surface coatings for surfaces such as monolith catalytic mufflers and the like and in the formation of aqueous pseudoplastic systems.

The subject material from which an aqueous dispersion is to be formed is alpha alumina monohydrate (boehmite). This material can be formed in various known and conventional manners. The particular method of preparing the alpha alumina monohydrate is immaterial with respect to the ability to form an aqueous dispersion therefrom according to the present invention. For example, it is well known that alpha alumina monohydrate can be readily formed by the homogeneous precipitation of basic alumina sulfate in accordance with the procedures taught in U.S. Pat. No. 3,919,403 to Pullen et al. In the Pullen et al process, basic aluminum sulfate is homogeneously precipitated from an aluminum sulfate solution by the in situ decomposition of an ammonia yielding compound contained in the aluminum sulfate solution. After precipitation has been completed, a basic solution is added to convert the basic aluminum sulfate to the desired alpha alumina monohydrate.

The subject alpha alumina monohydrate is also conventionally made by the hydrolysis of aluminum alcoholates. By this process aluminum alkoxides are hydrolyzed with water to yield an alcohol-solvent stream and an alumina-water stream. The alumina-water segment is then treated to remove organic impurities which might remain in the stream.

The alpha alumina monohydrates found useful in accordance with the present invention are substantially free flowing, solid, particulate materials. These materials may be completely crystalline or may be a mixture of crystalline and amorphous materials. The subject method of forming aqueous dispersions can be most readily accomplished with alumina having a crystallite size less than about 70 Å and, preferably, less than 35 Å. This crystallite size can be readily determined by conventional techniques of x-ray diffraction spectroscopy using the Scherrer equation. Material having crystallite size of greater than about 90 Å are generally unsatisfactory. Further, the subject alumina can have wide ranges of variations of surface area, particle size and pore volume. For example, alpha alumina monohydrates having a range of particle size (determined by a light scattering technique) of from about 5 to 80 microns have been found suitable with alumina monohydrate particles from 20 to 60 microns being preferred.

The process of the subject invention is carried out by forming a mixture of particulate alpha alumina monohydrate and water such that a concentration of the alpha alumina monohydrate is from about 1 to 40% by weight based on the weight of the water and preferably from about 1 to 15 by weight based on the weight of the water. This mixture is subjected to high shear rates for a period of time sufficient to form the desired dispersion. Suitable high shear rates are shear rates of greater than about 10,000 reciprocal seconds and preferably shear rates of greater than about 20,000 reciprocal seconds. Such rates can be readily obtained on a laboratory scale by the utilization of a Waring or other processing type blender. On larger scale, the mixture can be subjected to similar forces by the utilization of a conventional high speed emulsifier mixer such as the Dispersator which is manufactured by Premier, Inc., or by circulating the subject mixture through a small diameter capillary tube at a velocity sufficient to exert the desired shear rate on the mixture.

It has been found that by exerting the above-described shear rate on the mixture for short periods of time, such as from about 1 to 60 minutes and usually from about 5 to 45 minutes, one can readily obtain a stable, uniform, aqueous dispersion of alpha alumina monohydrate. The exact period of time required to form the desired dispersion depends upon the particular alpha alumina monohydrate used, its concentration in the subject mixture and the degree of high shear rate exerted thereon. The optimum amount of time required to produce the desired stable uniform aqueous dispersion can be readily ascertained by those skilled in the art by simple, conventional methods.

In addition, it has been presently unexpectedly found that one can form aqueous dispersions of alpha alumina monohydrate in a preferred manner by having the initially formed mixture, as described above, contain a small amount of a water soluble alkali metal base. The amount of base generally found useful is from about 1 to 5 percent by weight based on the weight of the alumina contained in the mixture and preferably from about 1 to 3 percent. Larger amounts of the water soluble alkali metal base can be utilized although it has been found normally unnecessary and is normally economically unproductive.

The water soluble base can be selected from any alkali metal oxide, hydroxide or carbonate or ammonium hydroxide. Examples of such materials are sodium hydroxide, potassium hydroxide, lithium hydroxide, sodium oxide, potassium oxide and the like as well as sodium carbonate, with sodium hydroxide being the preferred base.

The particular base or mixture of bases to be utilized can be dry mixed with the solid, particulate alpha alumina monohydrate. This preformed substantially uniform mixture of base and alpha alumina monohydrate can be done in any conventional manner such as in a tumble mixer or other conventional mixer suitable for mixing dry, particulate materials. The dry mixture of base and alpha alumina monohydrate can, thus, be readily shipped and immediately used without the need for any on site mixing of the component materials at the point of utilization. This is especially useful when the alumina dispersion is to be utilized at a location where on site mixing is not practical or where substantial uniform dry blending of the materials cannot be readily done. The mixture of particulate materials of base and alpha alumina monohydrate can thus be simply mixed with water and subjected to high shear rates as described hereinabove for short periods of time to produce a uniform, stable, aqueous dispersion of alpha alumina monohydrate.

Alternately, the water soluble base can be separately introduced into the water to be used as part of the aqueous dispersion either prior to, concurrently with or immediately subsequent to the introduction of the alpha alumina monohydrate to the water. Preferably, the base is added to the water and allowed to solubilize therein prior to the introduction of the solid, particulate alpha alumina monohydrate to the water to form the water-alpha alumina monohydrate mixture. It has been unexpectedly found that when a mixture of a water soluble base, alpha alumina monohydrate and water is subjected to the high shear rates described hereinabove, one obtains the desired substantially uniform and stable aqueous dispersions more readily than by using either high shear or base alone.

Particulate alpha alumina monohydrate, described above, can be coated with a water soluble alkali metal base to form a base coated particulate alpha alumina monohydrate which can then be used to form the initial mixture. The substantially uniform coating of the solid, particulate alpha alumina monohydrate can be achieved by various conventional methods, such as by fluidizing the particles of alumina and subjecting them to a mist of an aqueous solution of base or by separately introducing solid, particulate alumina and a mist or spray of aqueous solution of base into the head of a spray dryer, allowing the two materials to mix sufficiently to form a coating of base on the alumina particles in the weight relationship described above and subjecting the coated particles to a current of warm air of a temperature of from about 50° to 100° C. for a time sufficient to form substantially dried, coated particulate material.

Although it is not meant to be a limitation on the subject invention, it is believed that the alkali metal base is unexpectedly capable of rapidly forming an aqueous dispersion of the $\alpha$-$Al_2O_3 \cdot H_2O$ due to the interaction and possible formation of a reaction product on the surface of the alumina particle.

Aqueous dispersions formed from alpha alumina monohydrate in accordance with the teachings of the subject invention and especially when formed from the above-described mixtures of alpha alumina monohydrate and a water soluble base provide an aqueous system which has superior rheological and pseudoplastic properties as are required for certain applications.

The following examples are given for illustrative purposes only and are not meant to be a limitation on the subject invention except as indicated by the appended claims. All parts and percentages are by weight unless otherwise indicated.

EXAMPLE I

Ten parts of a commercially available alpha-alumina monohydrate sold under the tradename Catapal SB by Continental Oil Co. (formed as a by-product in the hydrolysis of aluminum alkoxides) was formed into a mixture with 90 parts of water. The mixture thus formed was divided into five samples. One of the samples, after initial low speed agitation, was allowed to stand. The alpha-alumina monohydrate contained therein settled out within a relatively short period of time. A second sample was subjected to magnetic stirring over a 16 hour period. The resultant dispersion was found to be unstable in view of the fact that the alpha-alumina monohydrate settled out a short period of time after mixing was stopped. The remaining three portions were subjected to high shear mixing for 5, 10 and 20 minute periods, respectively, using a commercially available Waring blender set at 19,000 rpm. The resultant dispersions each had a pH of about 8 and were observed to be stable aqueous dispersions of alpha-alumina monohydrate.

EXAMPLE II

A series of samples were prepared by mixing varying amounts of Catapal SB with water to which 0.25 or 0.5 percent sodium hydroxide had been previously dissolved. Each of the mixtures was subjected to high shear mixing in the manner indicated in Example I above. Each of the samples produced a stable aqueous dispersion as indicated in the results shown in Table I hereinbelow.

TABLE I

| Sample | α·Al₃O₃·H₂O (Wt %) | NaOH (Wt %) | High Shear Mixing (Min) | pH | Observation |
|---|---|---|---|---|---|
| IIA | 5 | 0.25 | 5 | 12.0 | Stable dispersion |
| B | 5 | 0.25 | 10 | 12.2 | Stable dispersion |
| C | 5 | 0.25 | 40 | 12.0 | Stable dispersion |
| D | 10 | 0.25 | 5 | 11.7 | Stable Dispersion |
| E | 10 | 0.25 | 10 | 11.4 | Stable dispersion |
| F | 10 | 0.5 | 5 | 12.1 | Stable dispersion |
| G | 10 | 0.5 | 10 | 12.0 | Stable dispersion |
| H | 20 | 0.25 | 5 | 10.8 | Stable dispersion |

EXAMPLE III

Aqueous dispersions of alpha-alumina monohydrate were prepared in the same manner as described in Example II hereinabove except that solid, particulate sodium hydroxide and alpha-alumina monohydrate were mixed together to form a substantially uniform mixture of the two materials. The mixture of materials was then added to water and subjected to high shear mixing as described in Example II hereinabove for a period of about 5-10 minutes. Each of the samples formed a stable aqueous dispersion of alpha-alumina monohydrate.

EXAMPLE IV 200 parts of Catapal SB having a particle size ranging from 5 to 90 microns were fluidized and sprayed with 125 parts of mist formed from an aqueous solution of 4 percent sodium hydroxide to produce coated material. The coated product was dried in a warm (50° C.) air oven for 16 hours to produce a coated alpha alumina monohydrate having about 2.5 percent sodium hydroxide based on the weight of alumina.

The coated alumina was subjected to high shear rates as described in Example II hereinabove for a period of about 5-10 minutes to form a stable, aqueous dispersion of alpha-alumina monohydrate.

EXAMPLE V

Samples of alpha-alumina monohydrate dispersions were prepared by mixing ten parts of solid, particulate Catapal SB with 90 parts of water and a second series of samples were made by mixing ten parts of solid, particulate Catapal SB with 90 parts of water containing 0.25% sodium hydroxide previously dissolved therein. The samples were subjected to high shear mixing by circulating each of the samples through a capillary tube having an inside diameter of 0.031 inches at a rate such that the shear rate to which the fluid was subjected was 50,000 sec⁻¹ for a period of 60 minutes. The sample containing the small amount of base produced an aqueous dispersion having excellent stability and the dispersion produced without the aid of base produced a dispersion of fair stability.

EXAMPLE VI

The rheological properties of each of the aqueous dispersions formed in Example II and the dispersion formed with the aid of base in Example IV were determined by measuring the shear stress as a function of shear rate. The values obtained were found to be described in accordance to the power law model relationship of $\tau = K(\dot{\gamma})^n$ wherein $\tau$ represents shear stress exerted on the aqueous dispersion in units of lbs/100 ft.²; $\dot{\gamma}$ is the shear rate in units of reciprocal seconds; K is a constant having the value of shear stress at a shear rate of one reciprocal second; and n is a numerical value of from 0 to greater than 1. Aqueous systems which have a shear stress vs. shear rate relationship in accordance with the power model relationship such that n is less than about 0.4 is a highly pseudoplastic, non-Newtonian fluid. p The rheological properties of shear stress vs. shear rate of the fluid were determined using standard procedures with a Haake RV-1 Rotvisco rotating viscometer with a MV-1 rotating spindle at varying shear rates of from 8.5 to 1370 reciprocal seconds at 25° C. The values of log shear stress vs. log shear rate were plotted for each material and the value for K was determined by extrapolation. The value of n and K for each of the aqueous dispersions are shown in Table II hereinbelow.

TABLE II

| Sample | Al₃O₃ H₂O conc. (%). | n | K | Adjusted pH |
|---|---|---|---|---|
| II-A | 5 | 0.31 | 3.9 | 9.8 |
| II-B | 5 | 0.28 | 11.4 | 9.7 |
| II-C | 5 | 0.16 | 15.5 | 9.7 |
| II-D | 5 | 0.26 | 7.6 | 9.9 |
| II-E | 5 | 0.18 | 11.1 | 9.8 |
| II-F | 5 | 0.25 | 7.0 | 9.8 |
| II-G | 5 | 0.18 | 5.9 | 9.8 |
| II-H | 10 | 0.21 | 10.0 | 9.8 |
| II-I | 7 | 0.26 | 10.4 | 9.8 |

EXAMPLE VII

A series of dispersions of alpha alumina monohydrates was prepared according to the procedure described in Example II except that the base was varied as indicated below. Samples of the initially formed mixtures were each subjected to high shear mixing by using a Waring blender for periods of 5 and 10 minutes. The resultant materials were visually observed and were tested using standard procedures for determining shear stress vs. shear rate relationships and, therefore, the materials pseudoplastic rheological properties according to the Power law relationship in the manner described in Example VI above. The results are given in Table III below.

TABLE III

| | Al₂O₃ H₂O Parts | | Parts Base | Mixing Time (in min) | | | |
|---|---|---|---|---|---|---|---|
| | | | | 5 | | 10 | |
| Sample | Parts | Base | | n | K | n | K |
| 1* | 10 | NaOH | 0.25 | 0.24 | 6.2 | 0.21 | 8.5 |
| 2 | 10 | KOH | 0.35 | — | — | 0.28 | 8.6 |
| 3 | 10 | LiOH H₂O | 0.26 | 0.6 | 0.1 | 0.4 | 4.0 |
| 4 | 10 | NH₄OH | 1.2 | 1 | 0.1 | 0.21 | 5.4 |
| 5 | 10 | Na₂CO₃ | 1 | 1 | <0.1 | 0.21 | 5.4 |
| 6** | 10 | Na₂SiO₃ | 1 | 1 | <0.1 | 1 | <0.1 |
| 7** | 10 | Na₂B₄O₇ | 1 | 1 | <0.1 | 1 | <0.1 |

*Diluted to 5 percent alpha alumina monohydrate
**Comparative

EXAMPLE VIII

A series of aqueous dispersions of alpha alumina monohydrate was prepared by first forming mixtures of 0.25 percent sodium hydroxide and 5 or 10 percent particulate alpha alumina monohydrate (obtained from various commercial processes) with water. Samples of each of the mixtures were subjected to high shear rates using a Waring blender for varying periods of time. The pH of each sample was adjusted, where necessary, to a final pH of 9.8. Each of the samples was observed and tested for the formation of a stable pseudoplastic dispersion according to the procedure used in Example IV above. The results are given in Table IV below.

TABLE IV

| Sample | $\alpha\alpha$-Al$_2$O$_3$ . H$_2$O | Shear Time (Min.) | Resultant pH | n | K | Adjusted Amount Alumina % | Comment |
|---|---|---|---|---|---|---|---|
| 1 | A @ 10 parts | 10 | 11.5 | 0.21 | 8.5 | 5 | Stable Disp. |
| 2 | B @ 10 parts | 10 | 11.8 | 0.28 | 6.8 | 7 | Stable Disp. |
|   |              | 20 | 11.9 | 0.27 | 17.2 | 7 | Stable Disp. |
| 3 | C @ 10 parts | 10 | 10.9 | 0.69 | 0.1 | 10 | Fair Disp. |
|   |              | 20 | 10.8 | 0.27 | 1.7 | 10 | Stable Disp. |
| 4 | A @ 5 parts | 60 | 11.8 | 0.24 | 6.4* | 2.5 | Stable Disp. |
| 5 | B @ 5 parts | 60 | 12.1 | 0.19 | 21.0* | 5 | Stable Disp. |
| 6 | C @ 5 parts | 60 | 10.9 | 0.21 | 6.1* | 5 | Stable Disp. |
| 7 | D @ 5 parts | 60 | 11.9 | 0.18 | 10.3 | 5 | Stable Disp. |

A - Commercially obtained from producer A and formed by hydrolysis of aluminum alkoxides
B - Commercially obtained from producer B and formed by hydrolysis of aluminum alkoxides
C - Commercially obtained from producer C and formed by aqueous precipitation
D - Commercially obtained from producer D and formed by basic sulfate process
*pH adjusted to 8.5

EXAMPLE IX

Samples of base coated alpha alumina monohydrate were formed by taking solid, particulate commercially available alpha alumina monohydrate (Catapal SB) and fluidizing the material using a laboratory fluidizing apparatus adapted with a conical mist nozzle at the top. Each of the fluidized powders were subjected to a mist of an aqueous solution of sodium hydroxide so as to have the mist contact substantially all of the fluidized particles. The amount of sodium hydroxide solution used was calculated such that the amount of base contained therein to alumina was 2.5 percent. Microscopic observation of the dried material showed that the particles were substantially uniformly coated with the base. The resultant samples were particulate and free flowing. Certain of the samples were dried at 50° C. for 16 hours.

10.26 parts of the above-described, coated alpha alumina monohydrate were mixed with 89.74 parts of water and the mixture was subjected to high shear mixing for 10 minutes using a Waring blender. The pH of each of the resultant dispersions was adjusted to 9.6 and diluted with water to a concentration of 5 percent alumina. The samples were observed and tested for rheological properties in the manner described in Example VI above. The results are given in Table V below.

TABLE V

| Sample | NaOH conc. in Mist Solution | Dried | Formed Dispersion | Rheological Prop. n | K |
|---|---|---|---|---|---|
| 1 | 25 | No | Yes | 0.31 | 1.8 |
| 2 | 12.5 | No | Yes | 0.33 | 1.5 |
| 3 | 6.25 | No | Yes | 0.33 | 1.5 |
| 4 | 4.0 | No | Yes | 0.18 | 11.7 |
| 5 | 4.0 | Yes | Yes | 0.18 | 9.7 |

Sample 5 of Table V above was further tested for rheological and pseudoplastic properties using the Haake Rotovisco instrument with MV-1, HS-II and HS-I rotors in order to determine the rheological properties at a shear rate from 8.5 to 36,400 sec$^{-1}$. (MV-1 for 8.5 to 1,300; HS-II from 1,300–6,300 and HS-I from 6,000 to 36,400).

The results showed that the material was a stable dispersion and capable of exhibiting non-Newtonian, pseudoplastic properties over a wide range of from the lowest level measured up to about 20,000 sec$^{-1}$.

While the invention has been described in connection with certain preferred embodiments, it is not intended to limit the invention to the particular forms set forth, but, on the contrary, it is intended to cover such alternatives, modifications and equivalents as defined by the appended claims.

I claim:

1. A method of forming an aqueous pseudoplastic dispersion of $\alpha$-Al$_2$O$_3$.H$_2$O comprising forming a mixture of water, a water soluble base and solid, particulate $\alpha$-Al$_2$O$_3$.H$_2$O, subjecting the mixture to high shear rates of greater than about 10,000 reciprocal seconds and for a time of from about 1 to about 60 minutes which is sufficient to cause a substantially complete aqueous pseudoplastic dispersion of said $\alpha$-Al$_2$O$_3$.H$_2$O.

2. The process of claim 1 wherein the $\alpha$Al$_2$O$_3$.H$_2$O is present in from 1 to 40 percent of the aqueous mixture.

3. The process of claim 1 wherein the aqueous mixture contains a base from about 0.1 to 5 weight percent based on the weight of the alumina present.

4. The process of claim 3 wherein the base is selected from the group consisting of an alkali metal oxide, hydroxide and carbonate, and ammonium hydroxide.

5. The process of claim 4 wherein the base is an alkali metal hydroxide.

6. The process of claim 5 wherein the alkali metal is sodium.

7. The method of forming an aqueous system which exhibits pseudoplastic properties comprising contacting solid, particulate. $Al_2O_3.H_2O$ and a solid, particulate, water soluble base with water to form an aqueous mixture thereof; subjecting the aqueous mixture to high shear rates for a period of time sufficient to form a stable, dispersion and adjusting the pH of the dispersion to greater than 8.

8. The method of claim 7 wherein the base is an alkali metal oxide or hydroxide.

9. The method of claim 7 wherein the high shear rate is at least about 10,000 reciprocal seconds.

10. The method of claim 8 wherein the base is sodium hydroxide or oxide.

* * * * *